US009180477B2

(12) United States Patent
Krogedal et al.

(10) Patent No.: US 9,180,477 B2
(45) Date of Patent: Nov. 10, 2015

(54) COLOR CHANGER

(71) Applicant: ABB Technology AG, Zurich (CH)

(72) Inventors: Arnulf Krogedal, Sandnes (NO); Ole-Morten Larsen, Tananger (NO)

(73) Assignee: ABB TECHNOLOGY AG, Zurich (CH)

( * ) Notice: Subject to any disclaimer, the term of this patent is extended or adjusted under 35 U.S.C. 154(b) by 312 days.

(21) Appl. No.: 13/853,435

(22) Filed: Mar. 29, 2013

(65) Prior Publication Data

US 2013/0255810 A1 Oct. 3, 2013

(30) Foreign Application Priority Data

Mar. 29, 2012 (EP) .................................... 12002292

(51) Int. Cl.

*F16K 11/16* (2006.01)
*B05B 12/14* (2006.01)
*B05B 15/02* (2006.01)

(52) U.S. Cl.

CPC ............. *B05B 12/149* (2013.01); *B05B 15/025* (2013.01); *Y10T 137/87096* (2015.04)

(58) Field of Classification Search

CPC ............................ B05B 12/149; B05B 15/025
USPC ................. 137/237, 238, 240, 246, 607, 614, 137/614.02; 239/106, 112, 113, 581.2, 239/582.1

See application file for complete search history.

(56) References Cited

U.S. PATENT DOCUMENTS

| | | | | |
|---|---|---|---|---|
| 2,257,004 | A * | 9/1941 | Fleming | 239/112 |
| 3,240,225 | A * | 3/1966 | Barrows | 137/240 |
| 3,443,578 | A * | 5/1969 | Hedin | 137/240 |
| 4,657,047 | A * | 4/1987 | Kolibas | 137/881 |
| 6,651,902 | B2 * | 11/2003 | Ehinger et al. | 239/104 |
| 7,712,681 | B2 * | 5/2010 | Fulkerson et al. | 239/113 |

* cited by examiner

*Primary Examiner* — Craig Schneider
*Assistant Examiner* — Reinaldo Sanchez-Medina
(74) *Attorney, Agent, or Firm* — Buchanan Ingersoll & Rooney PC

(57) ABSTRACT

A color changer includes a valve module with a first interaction area and a plurality of valves. The valves are connected on their respective inlet side to a respective supply duct and are connected on their respective outlet side to a common collecting duct. The valves are openable and closeable via respective switches by a first actuation end discharging into the first interaction area. The color changer includes a switching module with a second interaction area and one actuator, which discharges by a second actuation end into the second interaction area. The valve and switching modules are arranged with their respective interaction areas adjacent and are displaceable relative to one another. Due to a respective displacement movement, the second actuation end is simultaneously movable with respect to at most one of the first actuation ends into a respective actuation position so that the actuator opens or closes the corresponding valve.

18 Claims, 7 Drawing Sheets

10

COLOR CHANGER

REPLATED APPLICATION

This application claims priority under 35 U.S.C. §119 to European Patent Application No. 12002292.6 filed in Europe on Mar. 29, 2012, the entire content of which is hereby incorporated by reference in its entirety.

FIELD

The present disclosure relates to a color changer having particularly high reliability with regard to the avoidance of a possible color carry-over or color mixing.

BACKGROUND INFORMATION

It is known that a large number of different shades are used in industrial painting installations, for example, in painting installations for car bodies or attachments. Painting installations of this type are generally robot-based and, with typical cycle times from 60 s to 90 s, are designed to paint a different shade in each basic cycle, wherein 20 to 60 different shades is a customary number in the automotive industry. Color changers are generally provided in order to supply a paint material of the desired shade to a respective atomizer attached to a robot arm, for example. These color changers have a multiplicity of inputs for paint material, which are connected to corresponding supply lines for the different paint materials. The paint materials are generally provided by means of what are known as ring lines at various delivery points along the painting installation, and from there are guided to the respective color changer by means of the supply lines. A color changer may additionally have a common collecting duct, into which the supply lines discharge at least indirectly, wherein the output of the supply lines is connected via a line to the atomizer to be supplied with paint material.

Valve means are provided between the respective inputs of the color changer and the common collecting duct. Depending on which of the valve means is open, the corresponding paint material is introduced into the collecting duct during painting operation and from there is forwarded to the atomizer. At least one input of a color changer is normally connected via a valve means to a solvent line in order to clean the collecting duct, in the event of a color change, for the next paint material having a different shade. A feed of an air/solvent mixture is often used during a cleaning process and is produced by an alternating, pulsed feed of air and solvent. The cleaning effect of such a mixture is considerably increased with reduced solvent consumption.

The strict separation of different shades is of utmost importance, because even minimal color residues can lead to a distortion of the shade, for example, in the case of a marginal residue of a red shade in a white shade. Valve means are subject to wear and leaks can therefore also occur over time. If a valve means no longer closes reliably, marginal amounts of a paint material of a first shade can infiltrate the collecting duct and mix with a differently colored paint material located therein in spite of an actually closed state of a valve means.

A number of shades can, however, also be mixed due to the accidental simultaneous actuation of a number of valve means, and therefore the painted result is unusable. Even if measures are taken to prevent this by means of a control system, there is still always a residual risk of simultaneous actuation.

The damage caused by erroneously painted vehicle bodies is considerable, because the vehicle body has to be completely reworked and newly painted. Since, in a painting production line, a multiplicity of painting robots is generally involved sequentially in the painting of a single object, an assignment of erroneous painting to a specific painting robot or to the color changer associated therewith has generally proven to be very difficult and sometimes impossible. A painting installation containing a faulty paint changer is therefore generally to be decommissioned for the duration of a fault localization process, whereby the production capacity of the painting installation is reduced disadvantageously.

SUMMARY

An exemplary embodiment of the present disclosure provides a color changer which includes a valve module having a first interaction area, and a plurality of valve means included in the valve module. Each of the plurality of valve means includes an inlet side connected to a respective supply duct for paint material, and an outlet side connected to a common collecting duct. The exemplary color changer also includes a plurality of switching means each having a corresponding first interaction area, respectively. The switching means are configured to open and close a corresponding one of the plurality of valve means, respectively, by means of the respective first actuation end discharging into the first interaction area, respectively. In addition, the exemplary color changer includes a switching module having a second interaction area and precisely one actuator. The precisely one actuator is configured to discharge by means of a second actuation end into the second interaction area. The valve module and switching module are arranged with their respective first and second interaction areas adjacent to each other and are displaceable therealong relative to one another. As a result of a respective displacement movement, the second actuation end is configured to be simultaneously movable with respect to at most one of the first actuation ends into a respective actuation position so that the corresponding valve means is openable and closeable by the precisely one actuator.

DETAILED DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
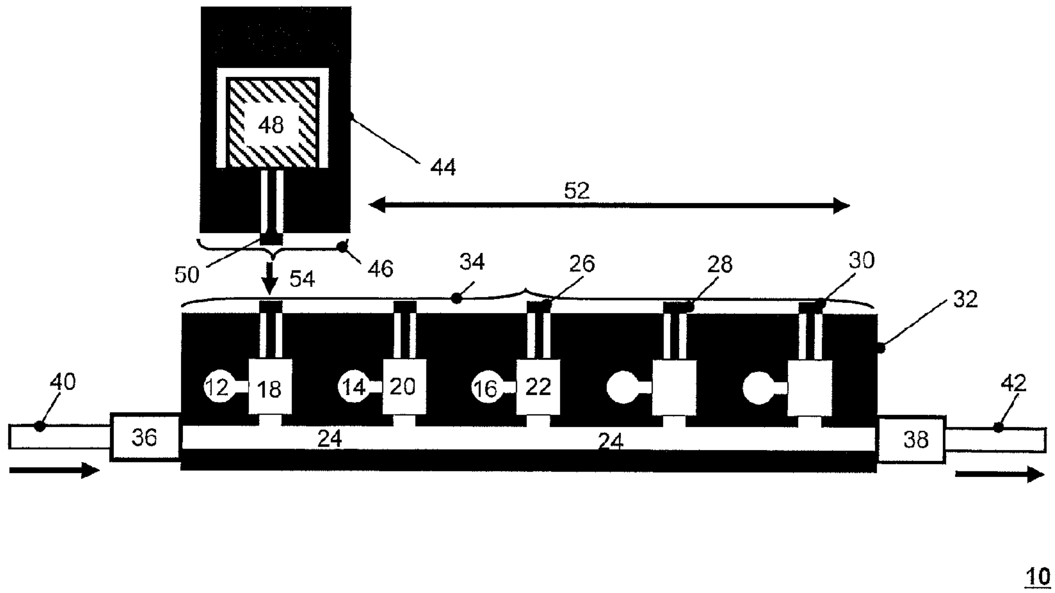
FIG. 1 shows a color changer according to an exemplary embodiment of the present disclosure.

Exemplary embodiments of the present disclosure is to specify a color changer, which is characterized by particularly high reliability with regard to the avoidance of a possible color carry-over.

An exemplary embodiment of the present disclosure provides a color changer which includes a valve module having a first interaction area, and a plurality of valve means included in the valve module. Each of the plurality of valve means includes an inlet side connected to a respective supply duct for paint material, and an outlet side connected to a common collecting duct. The exemplary color changer also includes a plurality of switching means each having a corresponding first interaction area, respectively. The switching means are configured to open and close a corresponding one of the plurality of valve means, respectively, by means of the respective first actuation end discharging into the first interaction area, respectively. In addition, the exemplary color changer includes a switching module having a second interaction area and precisely one actuator. The precisely one actuator is configured to discharge by means of a second actuation end into the second interaction area. The valve module and switching module are arranged with their respective first and second interaction areas adjacent to each other and are displaceable therealong relative to one another. As a result of a respective displacement movement, the second actuation end is configured to be simultaneously movable with respect to at most one of the first actuation ends into a respective actuation position so that the corresponding valve means is openable and closeable by the precisely one actuator.

Exemplary embodiments of the present disclosure are based on the objectives of physically precluding a simultaneous actuation of a plurality of valve means and also making a possible leak of valve means as clearly optically visible as possible.

Due to the presence of precisely one actuator, of which the second actuation end is simultaneously movable with respect to at most one of the first actuation ends of the switching means for the respective valve means into a respective actuation position, it is ensured as a result of the design of the color changer of the present disclosure that one valve means at most can be opened simultaneously. Color carry-overs or color mixing as a result of incorrect operation of the color changer are therefore advantageously prevented. The respective valve means, which is to be switched by the precisely one actuator, is selected by a respective displacement of the switching module relative to the valve module. To this end, in accordance with an exemplary embodiment, a drive device may be provided, for example, one or more stepper motors or pneumatic actuators. In an actuation position, the second actuation end of the precisely one actuator is positioned simultaneously with respect to at most one of the first actuation ends, wherein, in this position, a cooperation of the respective actuation ends is enabled. In accordance with an exemplary embodiment, the actuation ends may act perpendicularly to the respective interaction areas, for example, in the form of a common pushing or pulling movement. It is also possible, however, for the respective actuation ends to include lines, which are hermetically interconnected in the actuation position. For example, it is also possible to convey a compressed air from the actuator through the line duct thus formed from the switching module into the valve module and to thus switch a respective, selected valve means.

In accordance with an exemplary embodiment, the interaction areas are arranged adjacently, at least partly overlapping, and are displaceable or movable with respect to one another. In this case, it is both possible for the interaction areas to border one another directly, that is to say to be slidingly movable against one another, and for the interaction areas to be arranged in a mutual spacing, for example, 1-2 cm. The gap provided in this case is then to be bridged at least in the event of an actuation of a respective valve means by the actuation ends, which then accordingly protrude from the respective interaction area. It is also possible, however, for all first actuation ends of the switching means, for example, to protrude in the closed state from the first interaction area. Due to the discharge of the first switching ends into the first interaction area, it is also advantageously made possible for a paint material to collect at the first interaction area in the event of a possible leak of the paint material exiting the valve means and to therefore be visible particularly quickly, such that a possible leak is advantageously easily located.

In accordance with an exemplary embodiment, the switching means may constitute a mechanical operative connection between their respective first switching end and the valve means to be switched, for example, in the form of a push rod or the like. The push rod is then optionally connected directly via its side facing away from the actuation end to the valve means and therefore actuates the valve means as required. An actuator may be provided in order to carry out a linear movement. Should an actuator be capable of exerting a force only for one of its two directions of movement, corresponding spring elements may be provided in the actuator itself or in the switching means, such that the actuator is returned by a spring force.

In accordance with an exemplary embodiment of the color changer according to the present disclosure, the valve module and the switching module are movable relative to one another about a common axis of rotation, where the first actuation ends of the switching means are arranged around the axis of rotation along a circular path. By means of a simple rotational movement, the actuator of the switching module or the second actuation end thereof is thus movable into an actuation position relative to precisely one of the first actuation ends. The selection movement is therefore reduced to a degree of freedom of movement and therefore can be implemented in a particularly simple and positionally accurate manner. In addition, only a single drive is utilized to carry out this selection movement.

In accordance with an exemplary embodiment of the color changer according to the present disclosure, the common collecting duct transitions at its first end into an outlet duct. To this end, corresponding attachment means may be provided at the first end of the collecting duct or at the outlet duct, for example, a respective screw connection as a transition to a tube. A tube connection of this type may then be guided directly or indirectly to a respective atomizer, which is then mounted on a robot, for example.

In accordance with an exemplary embodiment of the present disclosure, an inlet duct discharges into the second end of the common collecting duct and is intended for the supply of air and/or cleaning agent. Due to the fluidic confluence provided at the start of the common collecting duct, the entire collecting duct starting from its second end to the first end can be cleaned and thus prepared for a next shade in the event of a color change, once all valve means have been closed. It is optionally possible to also allow a corresponding inlet valve for air and/or cleaning agent to be actuated by the precisely one actuator so that a common opening of a valve means for color together with the inlet valve for air and/or cleaning agent is precluded.

In accordance with an exemplary embodiment of the color changer according to the present disclosure, further valve means that can be opened and closed separately are provided for the inlet duct and/or the outlet duct. In the case of the outlet duct, a color flow to the atomizer can thus advantageously be interrupted, for example, in order to allow the paint material to be pressed on or in order to enable a synchronous switching of the color flow in accordance with the requirements of a robot's painting program.

In accordance with an exemplary embodiment of the color changer according to the present disclosure, the valve module and the switching module are designed and cooperate in such a way that the valve means are closed in the unactuated state. To this end, spring elements may be provided, which press the valve means in the rest state into the secure, closed state. In the event of an actuation of one of the valve means by the precisely one actuator, the actuator optionally applies a force acting against the spring force and therefore opens the respective selected valve means.

In accordance with an exemplary embodiment of the color changer according to the present disclosure, the switching means are designed in such a way that a respective valve means is opened as a result of a return movement of the second actuation end of the actuator into the second interaction area. This either causes the respective first actuation end of the respective selected switching means to be pressed with a spring force against the second actuation end of the actuator located opposite, or causes coupling means to be provided between the second actuation end of the actuator and the respective first actuation end, as a result of which the transfer of a pulling force is enabled. The respective valve means is opened by a return movement of the actuator.

In accordance with an exemplary embodiment of the present disclosure, coupling means are provided between the second actuation end of the actuator and respective first actuation ends to enable application of a pulling force therebetween. A permanent counterforce for closing the unactuated valve means is advantageously avoided, and therefore the reliability of the color changer is advantageously increased. In an exemplary nail-head-like embodiment of respective first actuation ends, a coupling means can be provided which can then be grasped by an interlockingly corresponding grip element of the second actuation end.

In accordance with an exemplary embodiment of the color changer according to the present disclosure, the switching means are designed in such a way that a respective valve means is opened by moving the second actuation end of the actuator out of the second interaction area. Here too, the unactuated valve means are advantageously closed without the action of a force on the first switching ends, wherein opening then occurs by the action of a pressing movement onto the respective selected first switching end.

In accordance with an exemplary embodiment of the color changer according to the present disclosure, the valve means have tubular coupling elements for paint material, which are fluidically interconnected in the open state and are moved away from one another in the closed state, such that a separation gap is then formed. The tubular coupling elements are part of the respective switching duct, which in the open state of a respective valve means is formed from the respective supply duct to the common collecting duct. The formation of a separation gap in the closed state means that further valve means and/or switching means are provided on either side of the separation gap as required. The valve means and/or switching means securely close the separation gap in the closed state with respect to the respective supply duct or the common collecting duct. In accordance with an exemplary embodiment of the present disclosure, the tubular coupling elements may be part of the switching means and are also suitable for transferring a compressive force or a compressive movement in the coupled state, as a result of which the respective selected valve means can then be opened.

The valve means and/or switching means closing the separation gap on either side may, for example, be the aforementioned switching means according to the disclosure on the supply duct side and an additional closing mechanism on the collecting duct side, the additional closing mechanism likewise being actuated via the switching means or is formed by the switching means itself. The formation of a separation gap reliably precludes the possibility of paint material flowing through the tubular coupling elements in the closed state. Any possible leak of one of the respective valve means leads to a discharge of typically pressurized paint material in the region of the separation gap.

In accordance with an exemplary embodiment of the present disclosure, for improved identification of a possible leak of this type, the respective separation gaps may be formed in an overlapping separation region, which thus receives the separation gaps of a plurality of valve means. It is also optionally provided for one or more separation regions that are accessible/visible from the outside to be formed. For example, such a separation region can be a groove or the like, for example, with a width from 1-2 cm, into which the coupling elements protrude from either side. The separation gaps of all or at least a plurality of valve means may be formed in the same groove. In the event of a leak, paint material exiting from any valve means thus collects in the same groove and can therefore be identified optically in a particularly simple manner.

In accordance with an exemplary embodiment of the color changer according to the present disclosure, the valve means are designed in such a way that, besides the closed and the open valve state, they can also adopt a third valve state, in which no separation gaps and no fluidic connection between the coupling elements is formed. This means that the tubular coupling elements are indeed coupled to one another, but the respective switching duct between the respective supply duct and the common collecting duct is closed, at least at the coupling point, by respective switching means and/or valve means. In this special cleaning position, this enables the cleaning of the collecting duct together with the collecting-duct-side coupling piece in the event of a color change, wherein it is reliably precluded that cleaning agent will infiltrate the supply-side coupling piece during this process.

In accordance with an exemplary embodiment of the present disclosure, the actuator is intended to adopt three actuation positions, which, in cooperation with the respective selected valve means, each correspond to a respective one of the valve states. Each of the three valve means states, specifically open, closed and rinse position, can therefore also be set reliably by the actuator.

In accordance with an exemplary embodiment of the present disclosure, the actuator functions on a pneumatic or hydraulic basis and is designed in such a way that the first actuation position is reached by supplying a pressure medium (e.g., compressed air) into a first input, and the second actuation position is reached by supplying a pressure medium into a second input. A possible embodiment lies, for example, in the fact that the actuator includes a cylinder with a movable piston therein, wherein pressure chambers are formed on either side of the piston. The first input and the second input for the compressed air feed discharge into another pressure chamber in each case. Depending on which of the two pressure chambers compressed air is then supplied to, the piston moves in one direction or in the other direction until a respective stop is reached. Return means, for example, a spring, bring the piston into a starting position when neither of the two outputs is acted on by a compressed air.

Additional features of exemplary embodiments of the present disclosure are described below with reference to the drawings.

FIG. 1 shows a sectional illustration of a color changer 10 according to an exemplary embodiment of the present disclosure. A plurality of valves 18, 20, 22 discharging via their outlet side into a common collecting duct 24 are arranged in a valve module 32 and are connected via their inlet side to respective supply ducts 12, 14, 16 for differently colored paint material. Switching means 26, 28, 30 discharging via a respective first actuation end into an interaction area 34 cooperate with the valve means 18, 20, 22 in such a way that the valve means 18, 20, 22 can be opened and closed from the interaction area 34. In this case, the respective switching means 26, 28, 30 may include a switch rod, which can be pressed downwardly on the interaction area side so that the associated valve means 18, 20, 22 is opened, the valve means also being closed in the unactuated state, similarly to all other valve means. It is also possible however with the use of corresponding coupling means to cause the valve means 18, 20, 22 to open by means of a pulling movement. The first actuation ends of the switching means 26, 28, 30 are in this case formed by nail-head-like expansions, for example. Purely pneumatic actuation of the valve means 18, 20, 22 via a connection duct that is hermetically closed in the actuation position is, however, also quite conceivable, wherein the connection duct is then formed at least in part by the respective switching means.

In FIG. 1, a switching module 44, which includes an actuator 48 and has a second interaction area 46, is arranged above the valve module 32. The valve module 32 and the switching module 44 are arranged in such a way that their respective interaction areas 34 and 46 are arranged opposite one another, wherein both modules 32, 44 are movable 52 with respect to one another along the interaction areas 34, 46 thereof, for example, by means of two drives in the X-Y direction. The actuator 48 discharges via a second actuation end 50 into the second interaction area 46, wherein the direction of movement of the actuation end 50 is perpendicular to the interaction areas 34, 46 arranged in parallel. The term “discharge” in no way means that an actuation end has to terminate flush with the relevant interaction area; rather the actuation end can also protrude outwardly or inwardly.

In this example, the switching module 44 is displaced into an actuation position for the valve means 18 in such a way that the second actuation end 50 of the actuator 48 is located precisely opposite the first actuation end of the switching means for the valve means 18. As a result of a movement of the second actuation end 50 out of the second interaction area 46, the first actuation end cooperating therewith is pressed downwardly and the valve means 18 is opened. A simultaneous actuation of all other valve means 20, 22 is advantageously precluded.

An outlet duct for the discharge of the respective selected paint material is provided at the first end of the collecting duct 24 of the color changer 10. A further, separately switchable valve means 38 is provided between the outlet duct and an associated outlet tube 42, which, for example, leads to an atomizer, in order to interrupt a paint flow to the atomizer as required. A further valve means 36, with which a cleaning agent provided via the inlet tube 36 can be conveyed into the collecting duct 24 as required so that it flows through the collecting duct 24 and then cleans it, is provided at the second end of the common collecting duct 24 between an inlet duct and an inlet tube 40. In the event of cleaning, the solvent may then be discharged via the outlet duct. In order to avoid simultaneous flooding of the common collecting duct 24 with cleaning agent and paint material, a supply of the cleaning agent via the valve means that discharges first into the common collecting duct (as considered on the basis of the direction of flow) is also possible however, that is to say the valve means 18 in this example.

Figure 2:
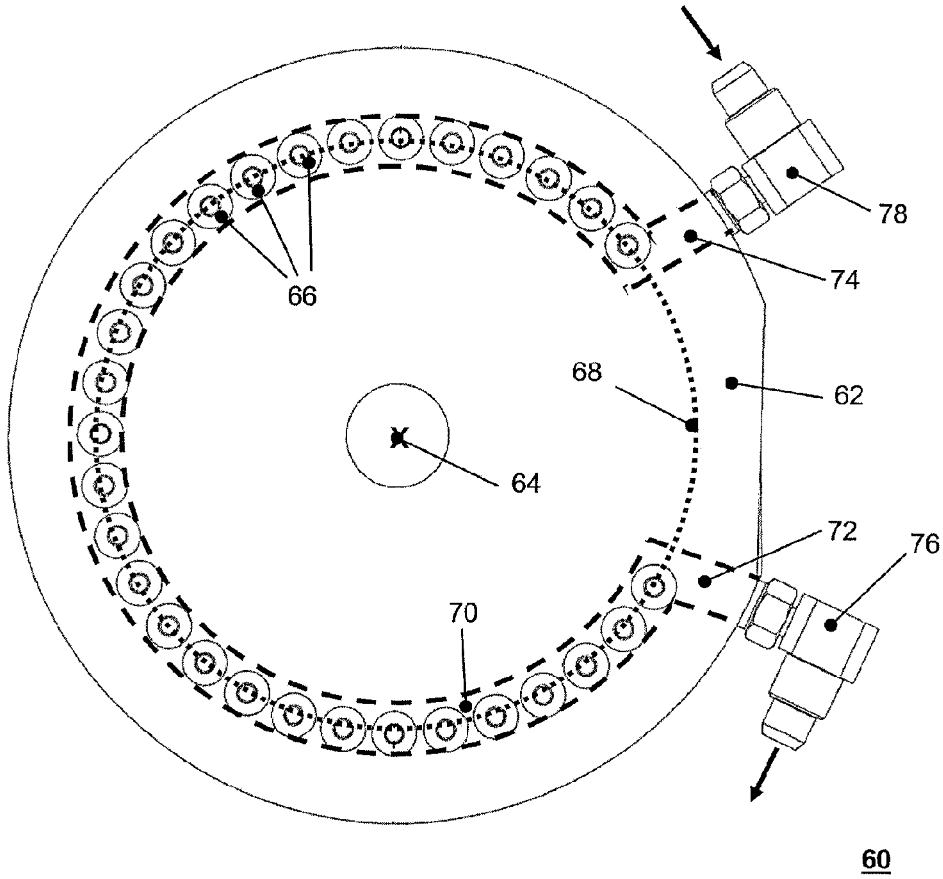
FIG. 2 shows a valve module according to an exemplary embodiment of the present disclosure.

FIG. 2 shows a plan view of an exemplary valve module 60. A multiplicity of first actuation ends 66 of respective switching means, which are assigned to respective valve means of the valve module 60, discharges into a first interaction area 62 of the valve module 60. The first actuation ends are arranged along a circular path 68, of which the midpoint is formed by a common axis of rotation 64 of the valve module 60 and of a switching module. A common collecting duct 70, substantially following the circular path 68, is arranged inside the valve module 60 and is connected at its first end 72 to an attachment piece 76 for an outlet tube and at its second end 74 to an attachment piece 78 for an inlet tube for cleaning agent. The switching module is rotatable relative to the valve module 60 about the common axis of rotation 64, wherein a switching end of an associated actuator is arranged at the distance of the radius of the circular path 68 so that it can be brought into a respective actuation position using precisely one of the respective actuation ends 66.

Figure 3:
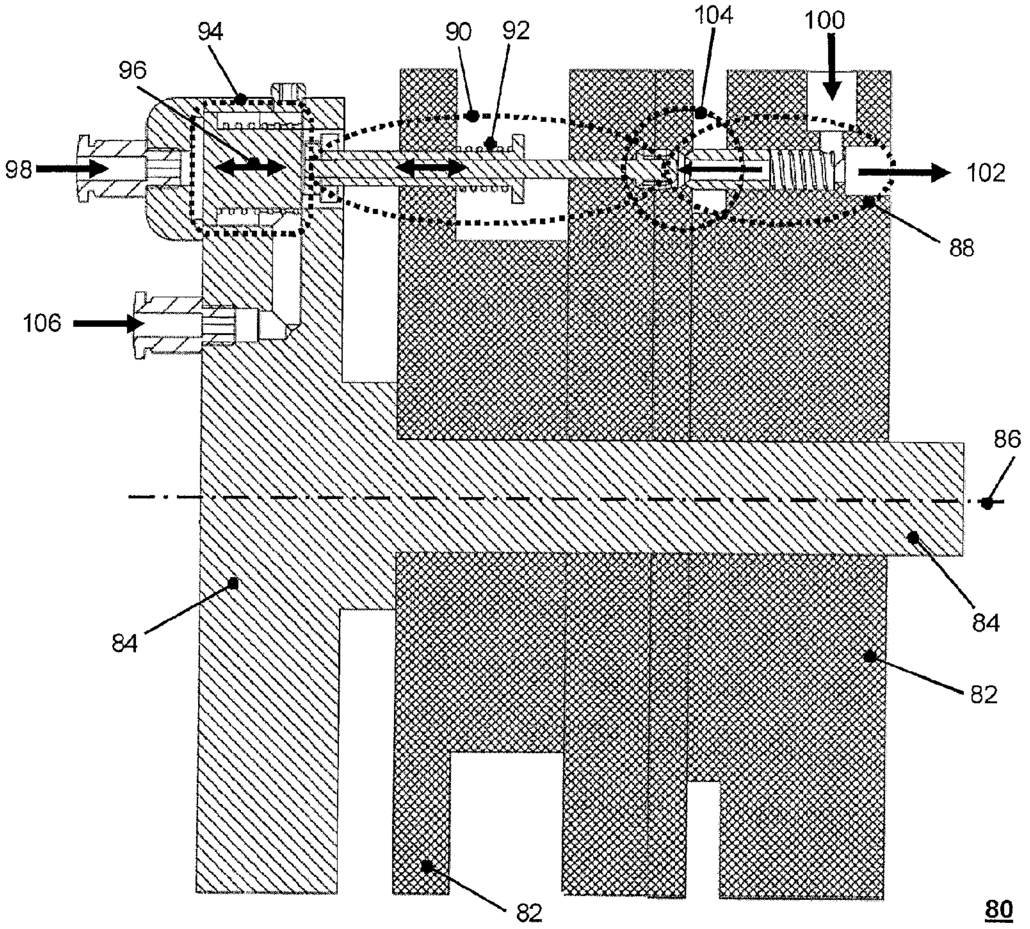
FIG. 3 shows a color changer according to an exemplary embodiment of the present disclosure.

FIG. 3 shows a sectional illustration of a color changer 80 according to an exemplary embodiment of the present disclosure. A cylinder-like valve module 82 and a cylinder-like switching module 84 are arranged around a common axis of rotation 86. The valve module 82 includes an exemplary valve means 88, which in this example is shown in an open state and constitutes a switchable connection piece between a respective supply duct 100 and an attachment piece to a tubular coupling element in the rear region thereof. The tubular coupling element is coupled in the contact region 104, which is shown again in FIG. 7 hereinafter in detail, to a corresponding coupling element, which is in turn connected to a common collecting duct. In the open state, paint material flows from the supply duct 100, through the valve means 88, into its rear region and, from there, through the coupling elements coupled in the contact region 104 into the common collecting duct. The movable, valve-means-side tubular coupling element is used on the one hand to pass the paint material through from the open valve means 88, but on the other hand also to actuate the valve means 88. The valve means is designed in such a way that it is moved from the open state into the closed state when the coupling element performs a pressing movement. Further comparable valve means are provided in the valve module 82

The supply duct 100 is part of a color supply system including a color circuit, wherein the recirculation duct from the color changer is denoted by reference numeral 102. The respective paint material of the various shades is thus in constant circulation, even if it is not conveyed into the common collecting duct. Sedimentation of color pigments is thus advantageously avoided.

The switching module 84 includes an actuator 94, which is intended to carry out a linear movement in the arrow direction 96 parallel to the common axis of rotation 86 and, in so doing, to adopt one of three defined positions. The actuator 94 is activated via a compressed air supply 98 and a compressed air supply 106, wherein one of the two compressed air supplies or neither of the compressed air supplies is acted on by compressed air in accordance with the respective position to be adopted. In this example, an opening position of the actuator 94 is activated so that it has adopted a first, rear position. The movement of the actuator 94 is transferred as a pulling movement to one end of a movable rod element, which discharges at its other end into the common collecting duct and either closes or does not close the duct depending on the switching position. Coupling means are provided, which enable a releasable connection between the first (actuation) end of the rod element and the second actuation end of the actuator 94. A pulling movement of the actuator 94 is thus also advantageously transferable to the switching means 90.

The pulling movement acts against the force of a spring element, which, in the unactuated state, presses the rod element in the direction of the valve means 88 and therefore closes the valve means reliably. A return movement of the actuator 94 and of the rod element connected thereto thus opens the valve means 88. At the same time, the rod element has a thickening at its end on the collecting duct side, the thickening closing the collecting duct with respect to the valve means 88 in the closed state of the valve means. With a rearwardly directed opening movement of the rod element, the collecting duct is released in the direction of the valve means 88, and the valve means 88 itself is also released, as is shown by way of example in FIG. 3 and in detail in FIG. 7.

The valve module 82 and the switching module 84 are rotated relative to one another about the axis of rotation 86 into such a position that the actuator 94 is opposite the valve means 88 in an actuation position. Force is transferred between the actuator 94 and valve means 88 in a coupling region 90 with corresponding switching means, of which an exemplary switching means (e.g., a return spring) is provided with reference numeral 92. A coupling region of respective switching means elements is provided for an open valve means with reference numeral 104 and is shown in a detailed view 132 in FIG. 7.

Figure 4:
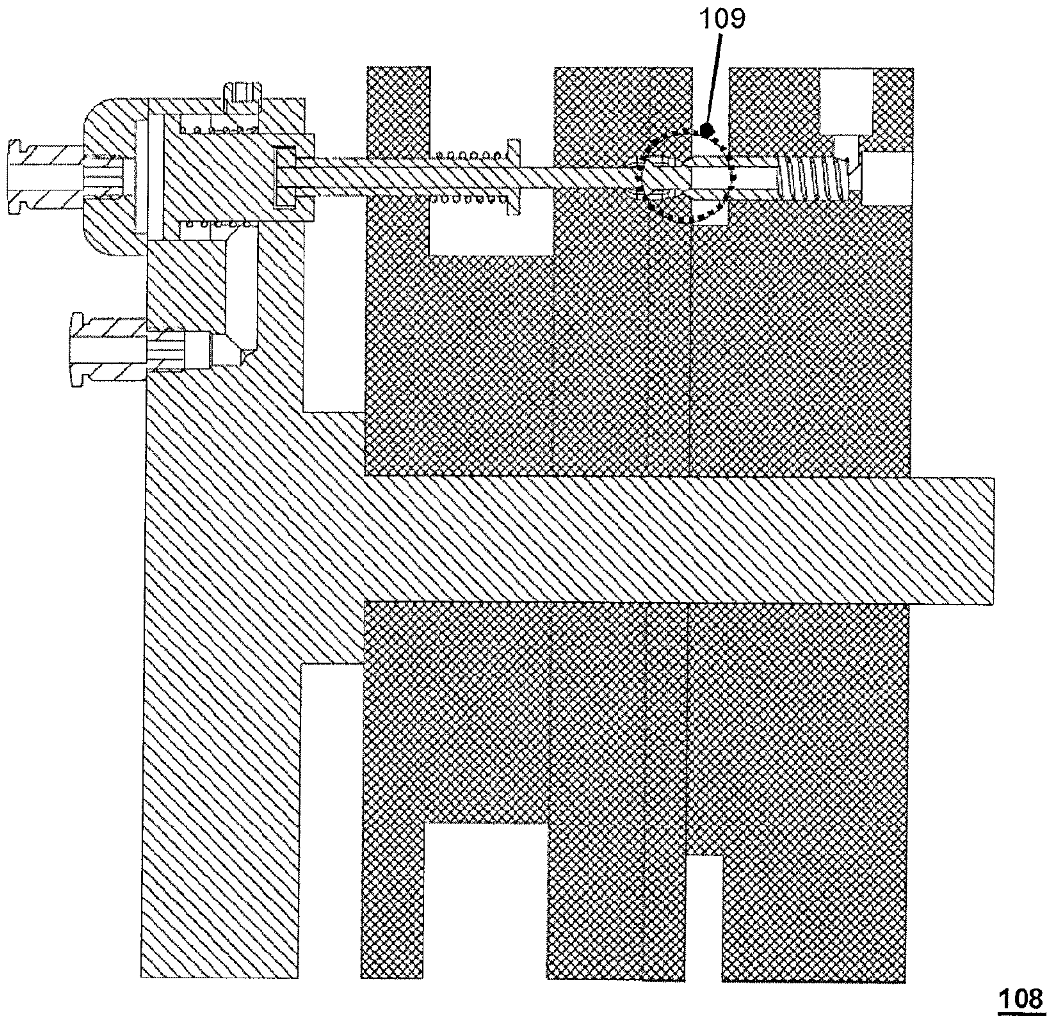
FIG. 4 shows a color changer according to an exemplary embodiment of the present disclosure.

FIG. 4 shows a sectional illustration of a color changer 108 according to an exemplary embodiment of the present disclosure. The color changer 108 corresponds substantially to the color changer shown in FIG. 3, wherein the actuator does not adopt an opening position however, but a cleaning position. This means that the tubular coupling elements are indeed coupled to one another, but the respective switching duct between the respective supply duct and the common collecting duct is closed at least at the coupling point by respective switching means and/or valve means. A coupling region of respective switching means elements for the valve means in the cleaning position is provided with reference numeral 109 and is shown in a detailed view 136 in FIG. 7.

Figure 5:
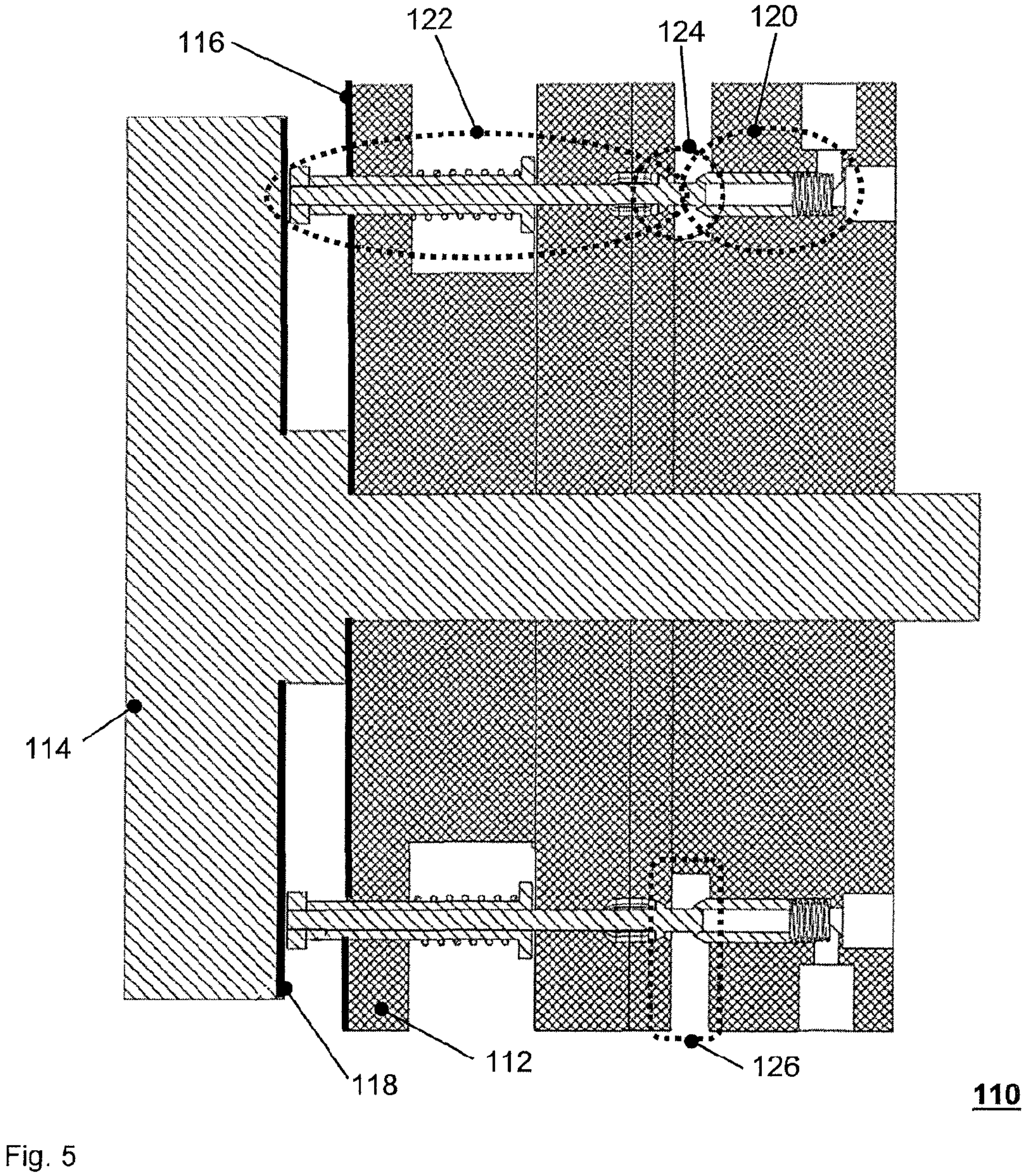
FIG. 5 shows a color changer with a first actuator position according to an exemplary embodiment of the present disclosure.

FIG. 5 shows a sectional illustration of a color changer 110 according to an exemplary embodiment of the present disclosure. A cylinder-like valve module 112 and a cylinder-like switching module 114 are arranged around a common axis of rotation. The valve module 112 includes two exemplary valve means 120, which in this example are shown in a closed state and each constitute a switchable connection piece between a respective supply duct and an attachment piece to a common collecting duct.

Switching means 122 discharging into a first interaction area 116 of the valve module 112 and protruding therefrom constitute a mechanical operative connection between the respective valve means 120 and an actuation end arranged opposite a second interaction area 118 of the switching module 114. The switching means 122 are designed in such a way that the valve means, in this unactuated state, are reliably closed. Actuation by an actuator is not provided in this illustration. Each of the valves of the color changer not actuated by the actuator is located in a closed position of this type. A second actuation end of an actuator can be brought into an actuation position for one of the valve means by corresponding rotation of the switching module about the axis of rotation. A coupling region of respective switching means elements for a closed valve means is provided with reference numeral 124 and is shown in a detailed view 134 in FIG. 7.

Figure 6:
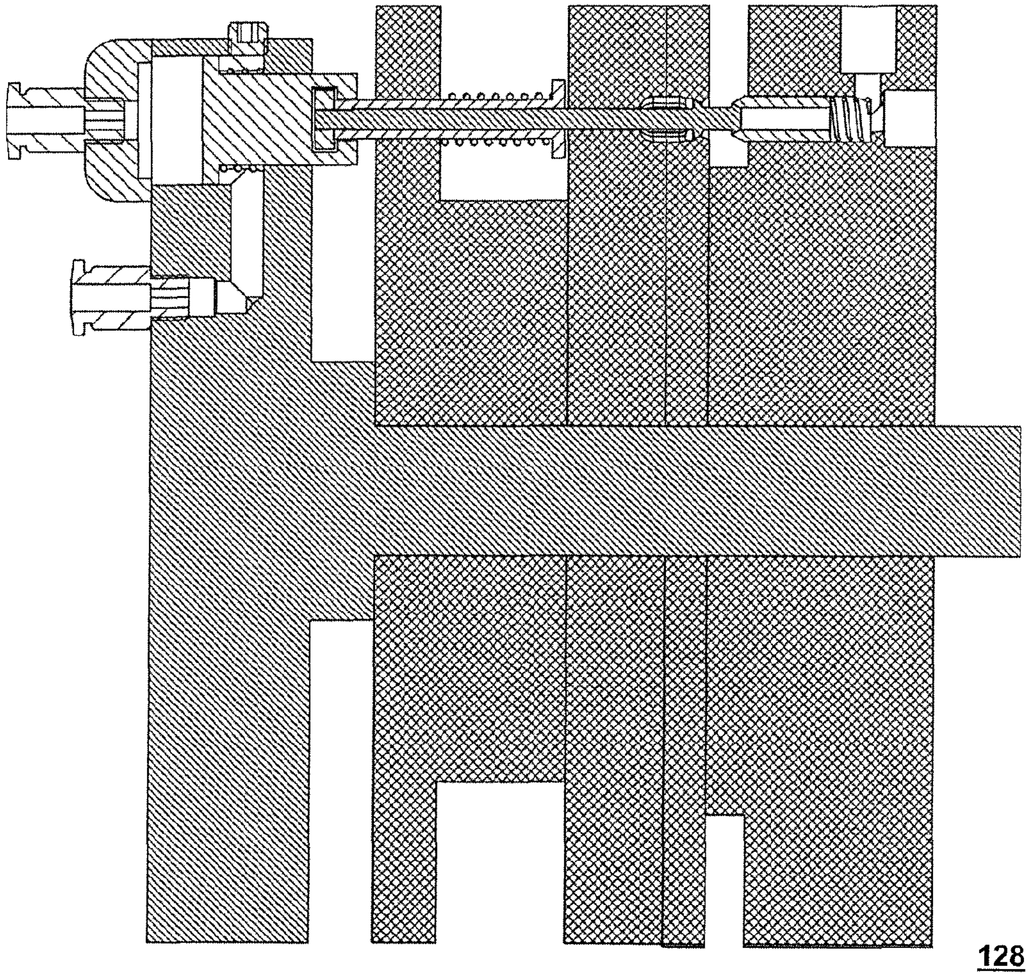
FIG. 6 shows a color changer with a second actuator position according to an exemplary embodiment of the present disclosure.

FIG. 6 illustrates the color changer 110 in the same valve position, but now with an engaged actuator. This is achieved by corresponding rotation of the switching module. The valve means can now be opened.

Figure 7:
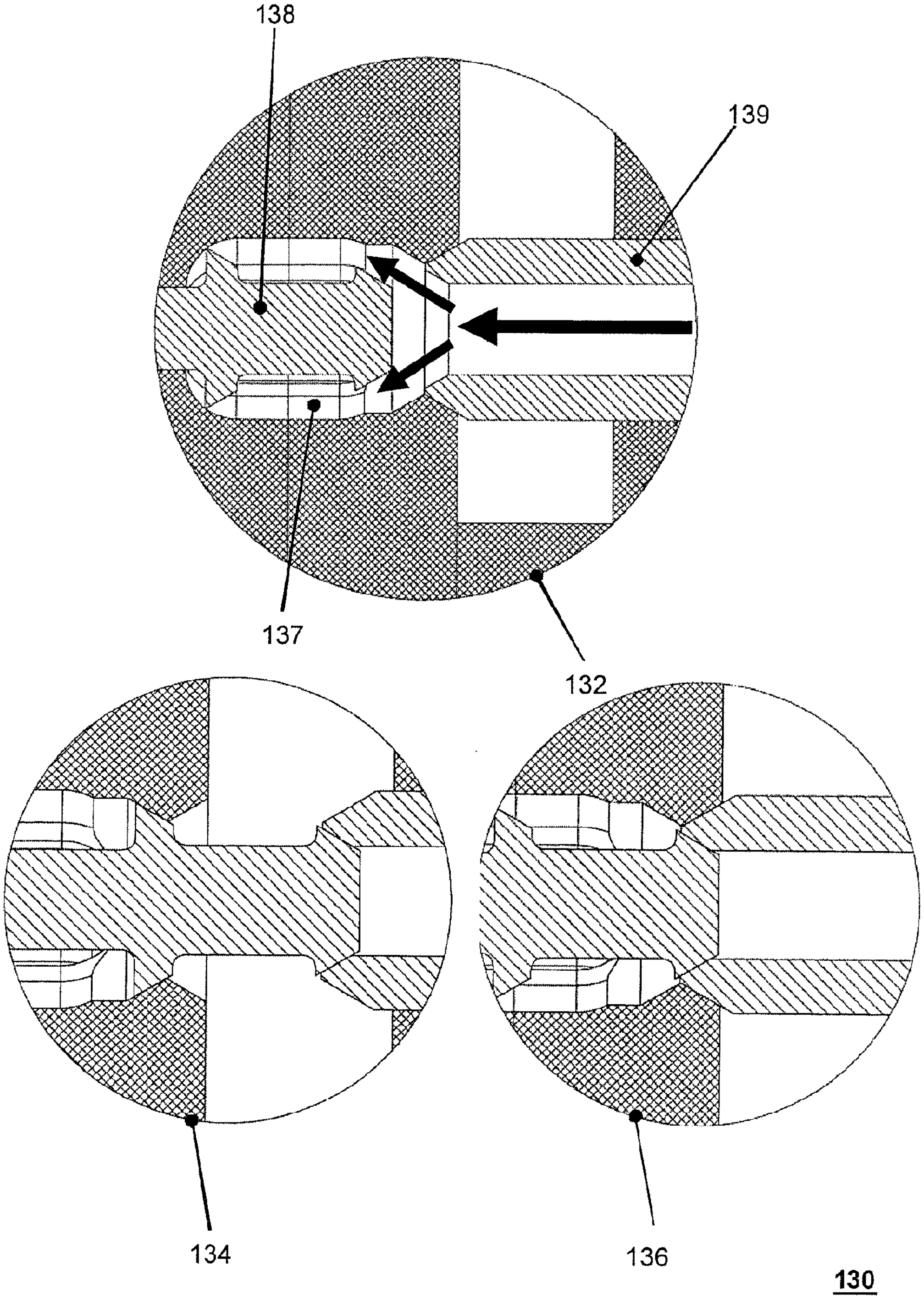
FIG. 7 shows contact regions between a switching module and a valve module according to an exemplary embodiment of the present disclosure.

FIG. 7 uses detailed drawings 130 to illustrate contact regions of exemplary switching means components operatively connected to one another, more specifically with the reference numeral 132 for the detail with the reference numeral 104 in FIG. 3 (open state), with the reference numeral 134 for the detail with the reference numeral 124 in FIG. 4 (closed state), and with the reference numeral 136 for the detail with the reference numeral 109 in FIG. 5 (cleaning state).

In the detailed drawing with reference numeral 132, a tubular coupling element 139 with a conoidal tip is shown, which is pressed by means of the force of a spring element against an interlockingly corresponding bore in a further coupling element, which discharges into a common collecting duct 137. The further coupling element may be milled together with a multiplicity of other further coupling elements into the same component part, in which the common collecting duct is also provided. A movable rod element 138 discharges from the opposite side into the common collecting duct, which cooperates in a force-locked manner with an actuator on its side remote from the collecting duct. The rod element 138 has been moved away from the interlocking bore by means of the actuator so that the bore is fluidically released. As indicated by the arrows, paint material can thus flow through the tubular coupling element 139 from an open valve means into the common collecting duct 137. The rod element 138 is moved away by the actuator against the force of a spring element so that the conoidal tip of the rod element 138 is pressed in the unactuated state by the spring force against the tubular coupling element 139 and closes the coupling element, as indicated in the detailed drawing with reference numeral 134 for the closed state.

The spring force with which the rod element 138 is pressed against the tubular coupling element 139 is greater than the spring force with which the tubular coupling element 139 is pressed away from the valve means. The tubular coupling element 139 is therefore pressed and moved by the spring force of the rod element 138 in the direction of the valve means, as can be seen in the detailed drawing 134, and closes the valve means. Furthermore, the rod element 138 has a bead-like thickening in its rear region, which, in the shown position, closes the common collecting duct 137. The tubular coupling element is therefore used both to forward paint material into its interior and as a push rod for actuation of the valve means. Due to the movement of the coupling elements 139 away from one another, a separation gap is advantageously formed in the closed state, whereby, in the event of a possible leak of one of the switching means and/or valve means closing the separation gap on either side, paint material is discharged into the groove shown, whereby a possible leak can then be particularly easily optically detected and whereby color carry-over is also precluded.

A contact region for the cleaning state is illustrated by reference numeral 136. In this case, the conoidal tip of the rod element 138 indeed closes the tubular coupling element 139, but does not press it in the direction of the valve means. In this position, the common collecting duct 137 can be reliably cleaned.

Figure 8:
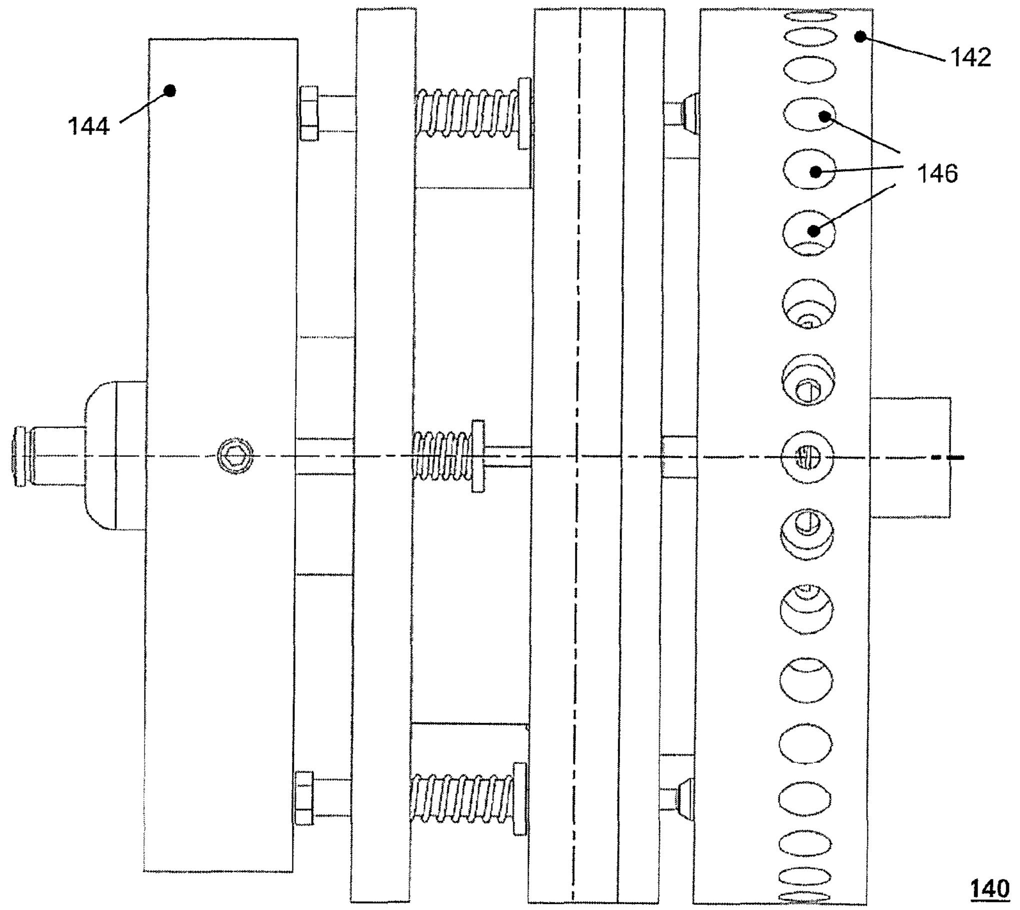
FIG. 8 shows a color changer according to an exemplary embodiment of the present disclosure.

FIG. 8 shows a side view of a color changer 140 according to an exemplary embodiment of the present disclosure. A valve module 142 and a switching module 144 are illustrated around a common axis of rotation, wherein the valve module 142 has supply ducts 146 running in a star-shaped manner toward the axis of rotation for differently colored paint materials.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SIGNS

10 exemplary color changer
12 first supply duct of the color changer
14 second supply duct of the color changer
16 third supply duct of the color changer
18 first valve means of the color changer
20 second valve means of the color changer
22 third valve means of the color changer
24 common collecting duct of the color changer
26 first switching means of the color changer
28 second switching means of the color changer
30 third switching means of the color changer
32 valve module of the color changer
34 first interaction area of the valve module
36 further valve means for switching the supply duct
38 further valve means for switching the outlet duct
40 inlet tube to the common collecting duct
42 outlet tube from the common collecting duct
44 switching module of the color changer
46 second interaction area of the switching module
48 actuator
50 second actuation end of the actuator
52 displacement movement between the valve module and the switching module
60 exemplary valve module
62 first interaction area of the exemplary valve module
64 common axis of rotation of the valve module and switching module
66 first actuation end of switching means for valve means
68 circular path
70 common collecting duct
72 first end of common collecting duct
74 second end of common collecting duct
76 attachment piece for attachment tube
78 attachment piece for supply tube
80 exemplary color changer
82 valve module of the color changer
84 switching module of second color changer
86 common axis of rotation
88 exemplary valve means in the open state
90 coupling region
92 exemplary switching means
94 actuator
96 direction of movement of the actuator
98 compressed air supply
100 supply duct
102 return duct
104 first contact region
106 bleeding
108 exemplary color changer
109 first contact region
110 exemplary color changer with first actuator position
112 valve module of the color changer
114 switching module of the color changer
116 first interaction area of valve module
118 second interaction area of switching module
120 exemplary valve means in the closed state
122 exemplary switching means
124 third contact region
126 separation region
128 exemplary color changer with second actuator position
130 contact regions
132 contact region in the first, opening state
134 contact region in the second, partly closing state
136 contact region in the third, closing state
137 common collecting duct
138 rod element
139 tubular coupling element
140 exemplary color changer
142 valve module of the color changer
144 switching module of the color changer
146 supply ducts

What is claimed is:

1. A color changer comprising:

a valve module having a first interaction area;

a plurality of valve means comprised in the valve module, each of the plurality of valve means including an inlet side connected to a respective supply duct for paint material, and an outlet side connected to a common collecting duct;

a plurality of switching means each having a respective first actuation end, the switching means being configured to open and close a corresponding one of the plurality of valve means, respectively, by means of the respective first actuation end discharging into the first interaction area, respectively; and a switching module having a second interaction area and precisely one actuator, the precisely one actuator being configured to discharge by means of a second actuation end into the second interaction area, wherein the valve module and switching module are arranged with their respective first and second interaction areas adjacent to each other and are displaceable therealong relative to one another, wherein, as a result of a respective displacement movement, the second actuation end is configured to be simultaneously movable with respect to at most one of the first actuation ends into a respective actuation position so that the corresponding valve means is openable and closeable by the precisely one actuator, wherein at least one of the valve means and the switching means have tubular coupling elements, through which paint material is flowable, the tubular coupling elements being fluidically interconnected in an open state and moved away from one another in a closed state to thereby form a respective separation gap, the tubular coupling elements being configured to forward paint material into their interior and to be a push rod for actuation of the at least one of the valve means and the switching means.

2. The color changer according to claim 1, wherein the common collecting duct transitions at its first end into an outlet duct.

3. The color changer according to claim 2, comprising:

an inlet duct configured to discharge into a second end of the common collecting duct for the supply of at least one of air and a cleaning agent.

4. The color changer according to claim 3, comprising:
further valve means for at least one of the inlet duct and the outlet duct, the further valve means being configured to be opened and closed separately.

5. The color changer according to claim 2, comprising:
further valve means for the outlet duct, the further valve means being configured to be opened and closed separately.

6. The color changer according to claim 1, comprising:
an inlet duct configured to discharge into a second end of the common collecting duct for the supply of at least one of air and a cleaning agent.

7. The color changer according to claim 6, comprising:
further valve means for the inlet duct, the further valve means being configured to be opened and closed separately.

8. The color changer according to claim 1, wherein the valve module and the switching module are configured to cooperate such that the valve means are closed in an unactuated state.

9. The color changer according to claim 8, wherein the switching means are configured such that a respective valve means is opened as a result of a return movement of the second actuation end of the actuator into the second interaction area.

10. The color changer according to claim 9, comprising:
coupling means between the second actuation end of the actuator and the respective first actuation end, the coupling means enabling application of a pulling force between the second actuation end of the actuator and the respective first actuation end.

11. The color changer according to claim 8, wherein the switching means are configured to open a corresponding one of the valve means by moving the second actuation end of the actuator out of the second interaction area.

12. The color changer according to claim 1, wherein the valve means are configured to, in addition to the closed and open valve states, adopt a third valve state, in which no separation gaps and no fluidic connection between the coupling elements is formed.

13. The color changer according to claim 12, wherein the actuator is configured to adopt three actuation positions, which, in cooperation with a respective valve means, each correspond to a respective one of the valve states.

14. The color changer according to claim 13, wherein the actuator is configured to function on a pneumatic basis such that the first actuation position is reached by supplying a pressure medium into a first input and the second actuation position is reached by supplying a pressure medium into the second input.

15. The color changer according to claim 1, wherein the valve module and the switching module are movable relative to one another about a common axis of rotation, and
wherein the first actuation ends of the switching means are arranged around the axis of rotation along a circular path.

16. The color changer according to claim 1, wherein the tubular coupling elements are part of the switching means and are configured to transfer at least one of a compressive force and a compressive movement in a coupled state, to open a selected one of the corresponding valve means.

17. The color changer according to claim 1, wherein the respective separation gaps are formed in an overlapping separation region.

18. The color changer according to claim 1, wherein the respective separation gaps are formed in a separation region that is at least one of accessible and visible from outside the color changer.

* * * * *